No. 746,296. PATENTED DEC. 8, 1903.
W. CRONK.
NUT LOCK.
APPLICATION FILED MAY 14, 1903.
NO MODEL.

WITNESSES:
M. E. Ver Eck.
A. Diven

INVENTOR
William Cronk
BY
Eugene Diven
ATTORNEY

No. 746,296. Patented December 8, 1903.

UNITED STATES PATENT OFFICE.

WILLIAM CRONK, OF MONTOUR FALLS, NEW YORK.

NUT-LOCK.

SPECIFICATION forming part of Letters Patent No. 746,296, dated December 8, 1903.

Application filed May 14, 1903. Serial No. 157,068. (No model.)

*To all whom it may concern:*

Be it known that I, WILLIAM CRONK, a citizen of the United States, residing at Montour Falls, in the county of Schuyler and State of New York, have invented a new and useful Improvement in Nut-Locks, of which the following is a specification.

My invention relates to improvements in locking devices by which a nut is held from turning or jarring loose from a bolt to which it is applied; and the object of my improvement is to provide a locking-plate especially adapted to be applied to the nut on the pivot-bolt of pruning-shears or other heavy cutting appliances of a like nature whereby the nut may be adjusted and set in any position relative to the bolt in order that the blades may be set up against one another with any desired closeness of fit.

In carrying out my object I provide a simple plate cut out to fit around the nut, with means for securing said plate in a position conforming with that assumed by the nut, all of which is represented in the accompanying drawings, in which—

Figure 1:
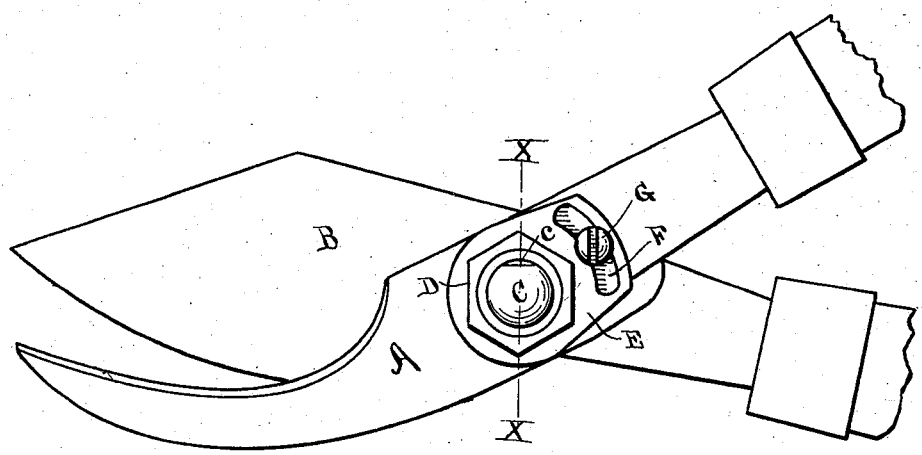
Figure 2:
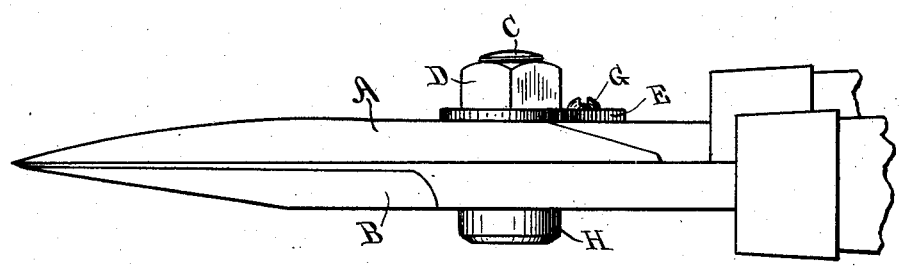
Figure 3:
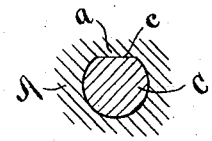
Figure 4:
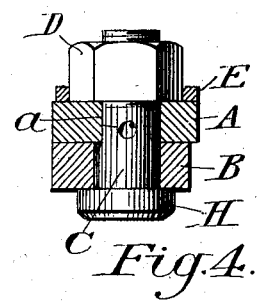

Figure 1 represents a plan view of the pruning-shears with my nut-lock applied thereto; Fig. 2, a side elevation of the same; Fig. 3, a detail showing a transverse section across the bolt and a portion of one of the blades, and Fig. 4 a vertical section on line X X in Fig. 1.

Like letters of reference indicate like parts in the several views.

The blades of the shears are represented by A and B and may be of any desired form. These blades are fastened together and pivoted the one to the other by the bolt C, which bolt is provided at one end with a head H and at the other end screw-threaded to receive the nut D. The blade B is free to turn upon the portion of the bolt adjacent to the head H, while the blade A is provided with means for preventing the turning of the bolt C therein, such means being illustrated in Fig. 3, in which the hole in the blade A through which the bolt C passes is shown squared off at one side at *a*, the bolt being similarly cut at *c* to correspond therewith. By thus forming the parts the bolt C may be drawn out through the blade A by means of nut D, so as to bring the blades A and B together with the desired closeness of fit, and when once the nut has been set for the desired adjustment and locked in such position to the blade A there can be no change in such adjustment no matter how roughly the shears may be used.

For locking the nut to the blade A, I provide a flat plate E of a shape to conform to a certain extent with the shape of the shank portion of the blade, this plate being preferably provided with a hole corresponding in shape to the nut, so as to engage it on all sides, and back of the nut I provide the plate with a slot F concentric with the bolt, which is engaged by a set-screw G, threaded into the blade A. The slot F is of sufficient length to allow for the turning of the nut to the extent which one face bears to the total number of faces of the nut. For instance, as illustrated the nut D is a hexagonal one, and the slot F will therefore have a length corresponding to one-sixth of the circumference of the circle upon which it is cut, thus allowing for an adjustment of one-sixth of a turn from one extreme of the slot to the other. If after the nut is in place it be found necessary to turn the nut backward or forward more than the slot will allow, the plate will be removed and set in a new position on the nut, either forward or backward, as may be required. When the nut is in its proper adjustment, the set-screw G will be set up, and thereafter the nut will be held from turning out of adjustment while the shears are in use. If it be found desirable to tighten or loosen the blades, the set-screw G will be loosened, after which the nut may be set forward or back to any degree of adjustment required, after which the set-screw is again tightened and the parts will be securely held in their newly-adjusted position.

A nut-lock of this description cannot become worn out with use and is susceptible of any degree of fineness of adjustment in the nut, and it may be made to conform with any shape of nut, either square, hexagonal, octagonal, or otherwise, slot F being of course made of a length proportionate to the number of sides of the nut. The hexagonal form of the nut, however, is preferable, as the length of the slot with this form of nut can be brought within practicable limits, so that the lock need not overlap the sides of the blade to any appreciable extent in either extreme of its position. It will also be understood that the bolt C may be prevented from turning in the blade A by any suitable means other than that which I have shown by way of illustration. While I prefer to have the plate surround the nut, it may be formed so as to only partially encompass it without departing from the spirit of my invention.

Having thus described my improved nut-lock, what I claim as my invention, and desire to secure by Letters Patent, is—

1. A nut-lock comprising a plate fitted around the sides of the nut, a curved slot in the plate concentric with the bolt, and a set-screw engaging said slot.

2. A nut-lock comprising a plate fitted around the sides of the nut, a curved slot in the plate concentric with the bolt and of a length sufficient to permit of the turning of the nut a portion of a revolution equal to one of the sides divided by the whole number of sides, and a set-screw engaging said slot.

3. The combination, with shears, of a pivot-bolt upon which one of the blades is free to turn, the screw-threaded end of the bolt having a sliding fit only through the other blade, a nut on the bolt for drawing the blades together, a locking-plate fitted around the sides of the nut, a curved slot in said plate concentric with the bolt, and a set-screw in the adjacent blade to engage said slot.

In testimony whereof I have affixed my signature in presence of two witnesses.

WILLIAM CRONK.

Witnesses:
C. F. CARRIER,
E. G. CRONK.